United States Patent [19]

Hackett

[11] 3,942,178

[45] Mar. 2, 1976

[54] INTRUSION DETECTION SYSTEM
[75] Inventor: Kenneth R. Hackett, Boulder, Colo.
[73] Assignee: Sontrix, Inc., Boulder, Colo.
[22] Filed: Mar. 27, 1974
[21] Appl. No.: 455,260

[52] U.S. Cl............................ 343/5 PD; 340/258 A
[51] Int. Cl.² ...................... G01S 9/02; G08B 13/18
[58] Field of Search ............... 343/5 PD; 340/258 A

[56] References Cited
UNITED STATES PATENTS

| | | |
|---|---|---|
| 3,665,443 | 5/1972 | Galvin............................ 340/258 A |
| 3,696,417 | 10/1972 | Pedersen ....................... 343/5 PD X |
| 3,706,989 | 12/1972 | Taylor, Jr. ......................... 343/7.7 X |
| 3,760,400 | 9/1973 | Galvin et al. .................... 340/258 A |
| 3,781,773 | 12/1973 | Ravas............................... 343/7.7 X |
| 3,796,989 | 3/1974 | Ravas et al. ................. 340/258 A X |
| 3,846,778 | 11/1974 | Galvin et al. .................... 340/258 A |

Primary Examiner—Malcolm F. Hubler
Attorney, Agent, or Firm—Charles E. Pfund

[57] ABSTRACT

An ultrasonic or microwave intrusion detection system uses a transmitter having one or more transducers or antennas for maintaining wave fields in the area to be protected and fed by one or more transducers or antennas which detects echo reflections of the energy from within the area. The receiver employs two mixers energized to be mixed with the echo signals and a portion of the energy from the transmitter, one of the mixers receiving such transmitter energy with 90° phase shift relative to the other mixer. The outputs of the two mixers thus are in quadrature phase relative to each other and define a rotating vector which contains the information relating to the echo signals. The product of these quadrature signals obtained by multiplying them together is processed continuously to obtain target information in the presence of substantially larger clutter return signals and other interference. The multiplication of the two quadrature signals to obtain cancellation of the clutter return signals and enhancement of the target signals is achieved without further phase shift requirements by differentiating one of the quadrature signals before it is multiplied with the other quadrature signal. In the preferred embodiment the differentiated quadrature signal is normalized to enhance the dynamic range of the equipment and eliminate the requirement for balanced channels.

10 Claims, 11 Drawing Figures

RESULTANT TANGENTIAL
VELOCITY, $v_T = v_{T_2} - v_{T_1}$

TORQUE, $m = K\omega b^2$
OR $m = K v_T b$ 3,942,178

INTRUSION DETECTION SYSTEM

BACKGROUND OF THE INVENTION

The detection of echo signals in CW systems where the echo return is deeply immersed in noise by the use of quadrature detection techniques is disclosed by Kalmus U.S. Pat. Nos. 3,432,855 and 3,733,581. In the basic embodiments therein shown, the outputs of quadrature mixer-detectors are correlated after one of the mixer outputs is subjected to a further 90° phase shift. Since the signals encountered in an ultrasonic intrusion detector alarm system cover a range of about 3 octaves in the doppler detected signal, the additional phase shifter required by Kalmus must provide this range with relatively constant amplitude response. Phase shifters of this type at the relatively low frequencies encountered in an intrusion detection alarm system are expensive and difficult to provide. Furthermore, these prior art circuits require good balance in the two channels to maintain the signals substantially equal, and when they are multiplied or correlated or otherwise compared to cancel the noise components the desired target components are proportional to the square of the signal amplitudes since the two equal amplitude signals are multiplied together. In systems which do not employ signal correlation to produce an output proportional to the product of the two inputs some form of signal summing is employed and the requirements for channel balance to maintain the quadrature channel signals equal in amplitude presents a more severe requirement. Systems which operate by sampling the peak amplitude of one of the channels based on sampling pulses derived from the quadrature timing points available in the other channel discard a substantial portion of the useful information and substitute the sample values with the result that such systems can be readily jammed or desensitized with high frequency noise components which have symmetrical frequency spectrum when translated through the mixers. Such jamming can exceed the dynamic range of the system with such symmetrical signals and mask the statistically deficient sampled target information to prevent an alarm being given.

SUMMARY OF THE INVENTION

The present invention employs quadrature detection in a CW intrusion detection alarm system and processes the quadrature outputs of the two mixers directly without further phase shift and on a continuous basis, using signal processing which essentially responds to the rotation of the phasor representing the quadrature signals. By multiplying each of these signals by the derivative of the other signal and combining the products a quantity directly proportional to the torque causing phase rotation is obtained without the requirement for a wide band constant amplitude phase shift circuit. By normalizing these derivatives which are used as products in obtaining this quantity the requirement for a balanced channel system is greatly eased. Finally, since the products each contain a continuous signal information signal packet containing the entire target and clutter signal information products, one complete channel can be eliminated and the alarm indication obtained by integrating the response of a single product channel. Thus circuit requirements and balance considerations between dual channels are reduced to an absolute minimum while maintaining a continuous full information content signal processing system capable of high sensitivity and detection of target signals in the presence of noise of much greater amplitude than the target echo signals and which is not limited by the phase response over several octaves of doppler frequency information nor saturated by the squared products of amplitude in two channels limiting dynamic amplitude range.

DETAILED DESCRIPTION OF THE PREFERRED EMBODIMENTS

Figure 1:
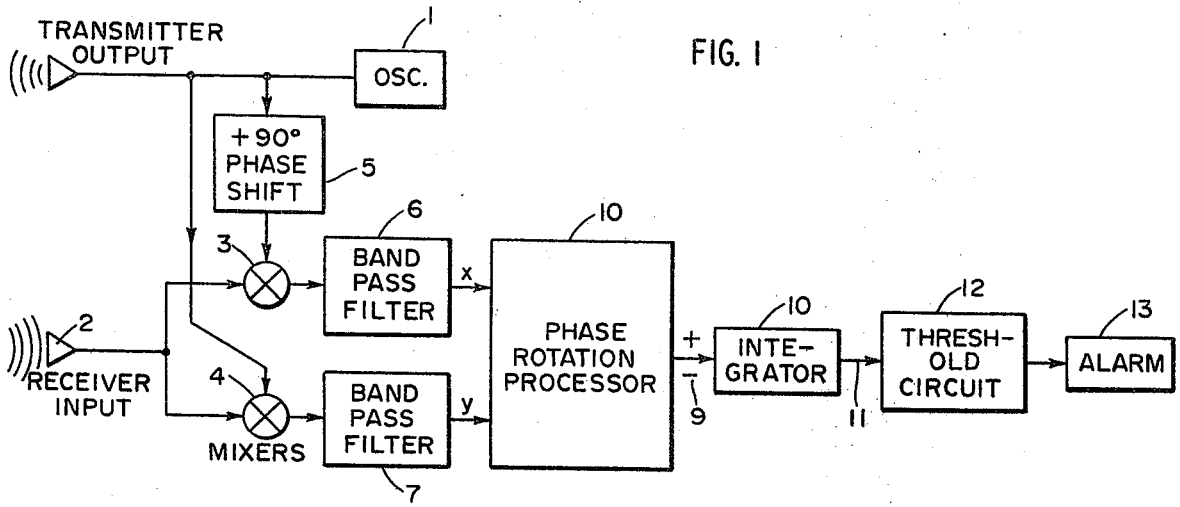
FIG. 1 is a block diagram of a complete CW intrusion detector alarm system.

Referring now to FIG. 1, the general arrangement of a quadrature detection CW radar system is shown as comprising an oscillator 1 which may be either ultrasonic or microwave to transmit energy from a transducer into the space to be protected. Energy reflected from the space and objects within the space is received at a receiver input 2 and applied to identical signal mixers 3 and 4. The mixers 3 and 4 heterodyne the incoming received signals with a sample of the frequency from oscillator 1 which is applied, as shown in FIG. 1, directly to mixer 4 and with a leading 90° phase shift through phase shifter 5 to mixer 3. Any well-known coupling device may be employed to select a small sample of signal from the oscillator 1 for use as the heterodyning signal. The outputs of the mixers 3 and 4 are selected by band pass filters 6 and 7 to select the difference frequency which difference frequency will be the result of the doppler effect derived from targets reflecting energy to the receiver input 2 which targets are in motion with respect to the transmitter and receiver transducers. Thus the band pass of filters 6 and 7 will normally correspond to the base band doppler frequency shift expected from targets of interest. The portion of FIG. 1 thus far described will readily be understood by those skilled in the art and correspond generally with the disclosure of the previously referenced patents to Kalmus.

In accordance with the present invention the direct outputs of the mixers 3 and 4 with higher frequency mixer components removed by filters 6 and 7 are processed directly by a phase rotation processor 10 which produces an output signal representing the net or resultant phase rotation forces produced by the concerted action of the quadrature detected signals from mixers 3 and 4. The output of the processor 10 is a bipolar signal 9 which is applied to an integrator 10, the integrated output 11 of which is applied to a threshold circuit 12 which when actuated operates an alarm 13. The integrator 10 operates on the bipolar signal 9 and cooperates with the preceding signal processing system to cancel the energy components of the spectrum which are derived from clutter and other noise components. According to Kalmus, this energy is distributed on both sides of the transmitter frequency when observed over a period of time as in integration while the energy containing the doppler shift from a moving target produces a signal component on one or the other side of the transmitter frequency and thus integrates cumulatively to a value which will exceed the threshold established by circuit 12 and thus actuate the alarm 13.

Figure 2:
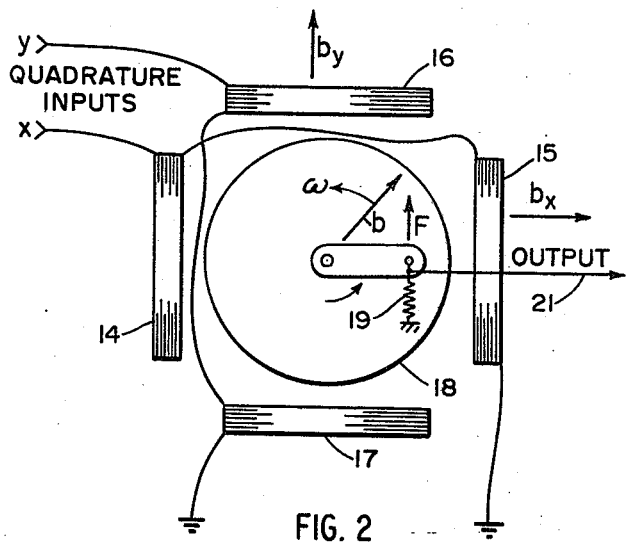
FIG. 2 is a schematic representation of an electro-mechanical phase rotation responsive device.

The outputs from the filters 6 and 7 representing the doppler frequencies are derived from the mixers 3 and 4 and designated X and Y as the inputs to phase rotation processor 10. In FIG. 2 these signals are applied to the space quadrature windings of a fixed rotor two-phase induction motor. Thus stator windings 14 and 15 in series are energized with the X signal and windings 16 and 17 in series are energized with the Y signal. The resultant flux caused by current flow in these respective sets of coils is indicated by the vectors $b_y$ and $b_x$ in FIG. 2. Rotor 18 of the motor is constrained and the force acting on the rotor is operative to generate a signal in a strain gauge 19 which produces an output signal on line 21 representative of the torque on the rotor 18. This torque is the result of the rotating vector field $b$ having an angular velocity $\omega$. The signal on line 21 can be applied as the input 9 to integrator 10 and will contain the full signal output information from the mixers 3 and 4 processed for integration without the requirement of electrical phase shift to bring the X and Y signals into phase or phase opposition conditions as required in the prior art.

Electro-mechanical processor such as shown in FIG. 2 have certain advantages including inertia and other mechanical parameters for performing useful operational functions. However, they do generally have disadvantages and represent relatively costly components and thus an all electronic system may sometimes be preferred. In order to obtain the electrical analog of the electro-mechanical system shown in FIG. 2 an analysis of the relation between the electric signals and the forces involved will be made with reference to FIG. 3.

Figure 3:
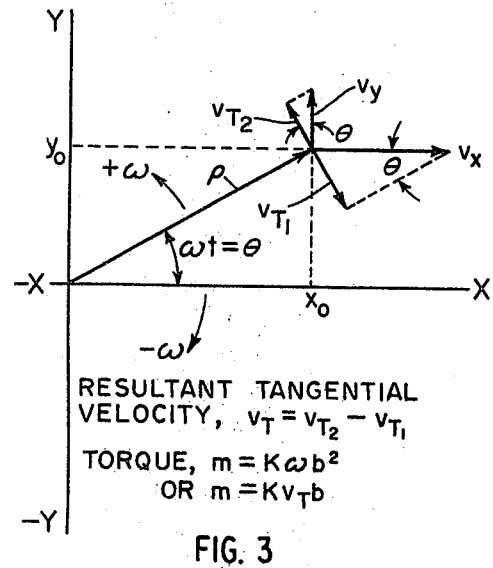
FIG. 3 is a phasor diagram showing the signal components involved in phase rotation.

In FIG. 3 the phasor $\rho$ is rotating at an angular velocity $\omega$ which can be positive or negative as indicated. The tangential velocity $v_T$ can be resolved in terms of the positive velocity $v_x$, in the $x$ direction and the positive velocity $v_y$ in the $y$ direction as shown. The torque, $m$, on rotor 18 is related to the resultant magnetic vector field, $\rho$ having components $x$ corresponding to $b_x$ and $y$ corresponding to $b_y$, and its angular velocity, $\omega$ as follows:

$$m = K\omega\rho^2 \quad (1)$$

where $K$ represents the motor transfer characteristics for the units of measurement used and $m$ is determined by the dynamics of signals $x$ and $y$. Rewriting equation (1) the torque can be expressed as follows:

$$m = K(\omega\rho)\rho \quad (2)$$

where $\omega\rho$ is the tangential velocity $v_T$, at the tip of phasor $\rho$, in FIG. 3. Thus:

$$m = K v_T \rho \quad (3)$$

$v_T$ consists of two components:

$$v_T = v_{T_2} - v_{T_1} \quad (4)$$

$v_{T_1}$ is the tangential velocity component due to $v_x$ (the first derivative of $x$). $v_{T_2}$ is the tangential velocity component due to $v_y$, (the first derivative of $y$).

Because of the geometrical relationship shown in FIG. 3, the following proportions exist:

$$\frac{y}{\rho} = \frac{v_{T_1}}{v_x} \quad \text{and} \quad \frac{x}{\rho} = \frac{v_{T_2}}{v_y}$$

solving for $v_{T_1}$ and $v_{T_2}$:

$$v_{T_1} = v_x \frac{y}{\rho} \quad (5)$$

$$v_{T_2} = v_y \frac{x}{\rho} \quad (6)$$

From equation (4):

$$v_T = \frac{1}{\rho}(xy' - yx') \quad (7)$$

where $x'$ and $y'$ (i.e., $v_x$ and $v_y$) are the first derivatives of $x$ and $y$.

Substituting (7) into (3):

$$m = K(xy' - yx') \quad (8)$$

the $\rho$ term disappears. The torque is epxressed in terms of $x$ and $y$.

Figure 4:
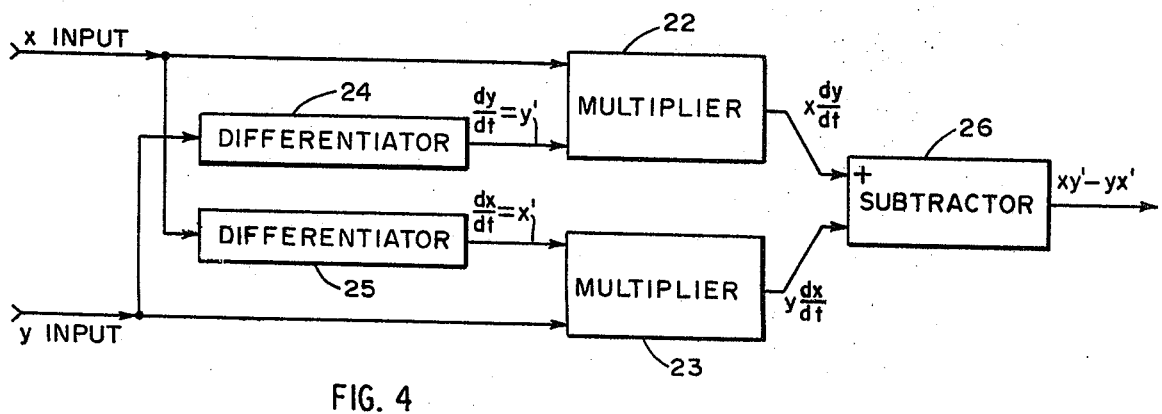
FIG. 4 is a block diagram of an electronic analog of the electro-mechanical signal processor of FIG. 2.

Since the torque which is a measure of the net phase rotation signal can be readily derived from the $x$ and $y$ signals and their derivatives, a quantity proportional to torque can be derived electrically as shown in FIG. 4. As indicated, the $x$ and $y$ inputs are applied as direct inputs to respective multipliers 22 and 23 and these input quantities after differentiation in differentiators 24 and 25 are applied as the factor input to the multiplier for the opposite signal as indicated. Thus the output of multiplier 22 is $$x \frac{dy}{dt}$$

or $xy'$ and the output of multiplier 23 is $$y \frac{dx}{dt}$$

or $yx'$. Taking the difference of these two quantities in subtractor 26 gives the desired output quantity $xy' - yx'$. It should be noted that the outputs of the multipliers 22 and 23 are continuously present for both moving target and clutter interference signal returns. As stated by Kalmus, the clutter energy is distributed on both sides of the transmitter frequency and thus cancels in the output of the multipliers after these components have been intergrated over a sufficient period of time. The continuous frequency waves of a moving target, however, when processed according to FIG. 4 implementation produces a constant amplitude continuous signal (DC) the polarity of which indicates the direction of rotation and thus whether or not the target is approaching or receding from the transmitter. Taking the quadrature $x$ and $y$ signals as sine and cosine terms at the doppler angular frequency $\omega$ we have:

$x = A \cos \omega t\ x' = -A \omega \sin \omega t\ y = A \sin \omega t\ y' = A \omega \cos \omega t$ from (8)

$m = K[A \cos \omega t (A \omega \cos \omega t) - A \sin \omega t(-A \omega \sin \omega t)]$ which reduces to:

$m = KA^2\omega$               (9)

For constant target velocity all the factors on the right in (9) are constant; hence, $m$ is constant. The sign of $m$ is a function of the sign of 107. $+\omega$ represents a counter-clockwise phase roation. $'\omega$ represents a clockwise rotation.

Figure 5:
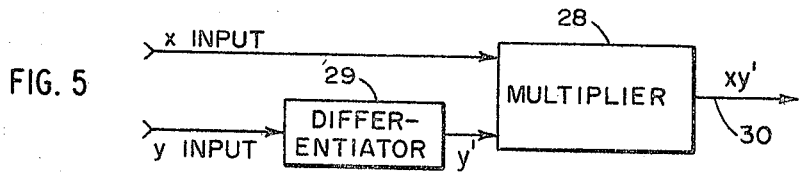
FIG. 5 is a block diagram of a simplified phase rotation signal processor.

Referring to FIG. 5 a simplified version of the electronic phase rotation processor will be seen to constitute one-half of the symmetrical system shown in FIG. 4. Thus the $x$ input is applied directly to a multiplier 28 and the $y$ input is applied to a differentiator 29, the output of which, $y'$, is applied as the other input to multiplier 28. The resulting output on line 30 is the quantity $xu'$ and corresponds precisely with the output of multiplier 22 in FIG. 4. It will be noted that the quadrature mixers 3 and 4 of FIG. 1 provide output doppler signals which contain the full information content both as to real targets and clutter or noise information, the only difference therebetween being the phase relation. Thus each signal bears the same relation to the other signal and the quantities $xy'$ and $xx'$ provide redundancy as to their information content. Accordingly, selecting one or the other of the quantities $xy'$ or $yx'$ will provide the full information content but is statistically less effective in accumulating moving target signal energy and likewise in averaging or cancelling clutter return energy. For sufficient period of integration, either $xy'$ or $xx'$ will average clutter signals to zero and accumulate a signal of increasing magnitude for a moving target return. Thus the circuit of FIG) 5 can be directly substituted for the phase rotation processor 10 of FIG. 1 and the improved performance of applicant's invention obtained with simplified and economical apparatus. There is in fact a further advantage to the processor of FIG. 5 in that it does not require balancing with respect to a channel purported to be identical thereto but which may when malfunctioning introduce an unbalanced condition.

Figure 6:
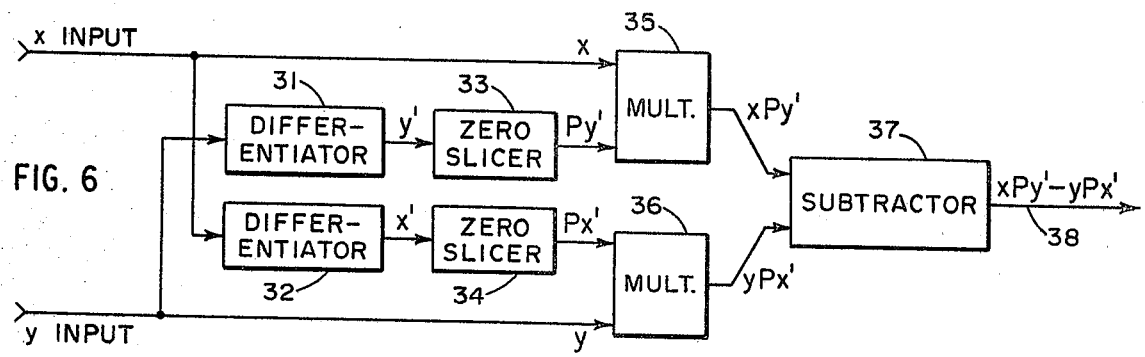
FIG. 6 is a block diagram of a phase rotation signal processor using normalized factors to obtain the signal products.

A further improvement and simplification is shown in the modified phase rotation processor shown in FIG. 6. It will be recalled from the description of the previous embodiment and equations (9) and (10) that the quantity being measured both as the useful signal and clutter signal is proportional to the square of the amplitude of the various signal components. In echo signal systems generally and intrusion alarm systems in particular the dynamic range of signals encountered is extremely large and the presence of large signals results at times in exceeding the dynamic range of electronic channels which include amplifiers, differentiators and multipliers and similar components. The processing of signals which are squared accentuates this problem and can result in a system which is capable of handling only signals within a limited amplitude range. Conversely, if the signal information could be processed with only the first power of the amplitude quantities requiring operational conversion, such as differentiation and multiplication, improved results can be obtained in that wider dynamic signal range can be accommodated and the system is not susceptible to being disabled by high amplitude signals. At the same time it is important that the improved processing be obtained with full utilization of the formation content of the signals since the difficult discrimination between the true signal and clutter return must nevertheless be achieved with signals deeply buried in the clutter signals.

Figure 7:
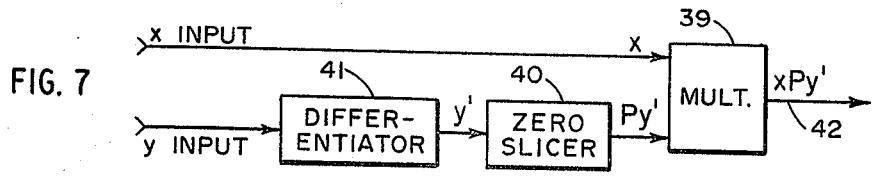
FIG. 7 is a simplified version of a normalized signal product processor.

The systems of FIGS. 6 and 7 achieve the operation and advantages just described by processing signals as previously described for the systems of FIGS. 4 and 5 respectively but with the amplitude information removed from the differentiated signal component. Thus in FIG. 6 multiplier 35 produces the product of input signatl $x$ and a quantity $Py'$ which is the quantity $y'$ having the polarity of the $y'$ signal but with normalized or unit amplitude constant throughout the period during which $y'$ remains at each polarity. multiplier 36 produces a product $yPx'$ by multiplying the quantities $y$ applied thereto and $Px'$ derived from $x'$ by removing the amplitude information therefrom. Thus the system of FIG. 6 differentiates the $x$ input in differentiator 32 and passes $x'$ to a zero slicer 34 which produces the signal $Py'$ having the same polarity as $y'$. The outputs of amplitude. Similarly the y input signal is differentiated in a differentiator 31 and the signal $y'$ is applied to a zero slicer 33 to produce the unit amplitude bipolar signal $Py'$ having the same polarity as $y'$. The outputs of the multipliers 35 and 36 are applied to a subtractor 37 to produce on output line 38 the signal $xPy' - yPx'$. The system of FIG. 7 is identical to one-half of the FIG. 6 system and applies the $x$ input to a multiplier 39 while the $y$ input is differentiated in differentiator 41 to apply $y'$ to a zero slicer 40 which applies $Py'$ to the multiplier 39. The output line 42 thus has the quantity $xPy'$ thereon.

Figure 8A:
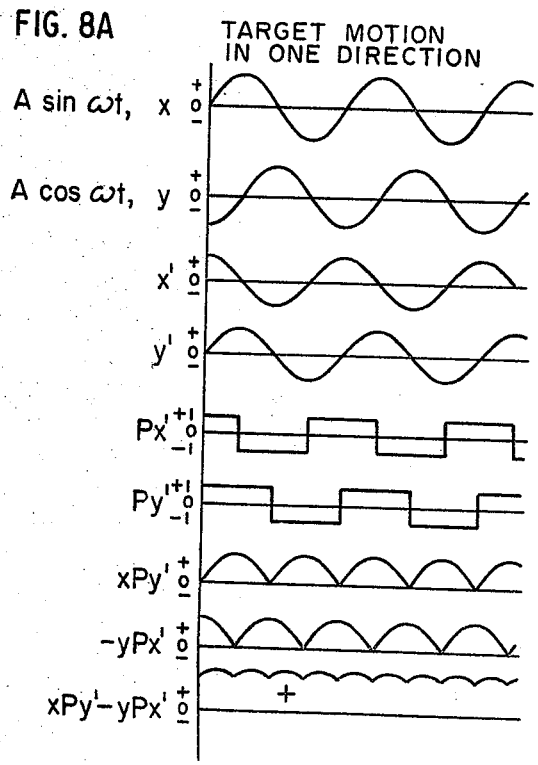
FIGS. 8A and 8B are wave form diagrams showing signal processing for targets moving toward and away from the transmitter with normalized differentiated signals.
Figure 8B:
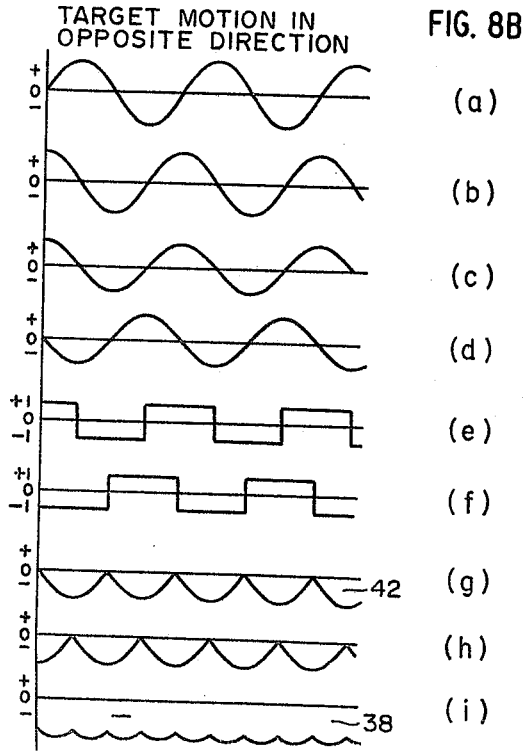

Referring now to FIGS. 8A and 8B typical target wave forms are displayed for the operation of this system with multiplication of those waves shown for the normalized or constant value derivatives employed as one factor in obtaining the product. Thus lines (a) and (b) show the cosine and sine signals obtained from the quadrature detectors 3 and 4 of FIG. 1. As is apparent from Kalmus the relative phase of these signals changes between 90° lead and lag as the target motion changes direction. The waveforms shown on lines (c) and (d) represent $x'$ and $y'$ differentiated values of $x$ and $y$ respectively. As can be seen by observing the instantaneous values thus obtained, the products $xy'$ and $yx'$ when multiplied through a four-quadrant multiplier produce continuous signal components of opposite polarity. When both of these components are used by application to subtractor 26 or 37, all components are additive to accumulate the maximum signal response from the moving target returned components. Thus output 38 for the system of FIG. 6 is indicated in line (i). This signal on line (i) is the result of direct addition of the signals indicated at line (g) and (h) which represent $xPy'$ and $-yPx'$. In the single channel systems the signal output 42 is as indicated on line (g). In all of the responses (g), (h) and (i), the product obtained by signal multiplication with the normalized derivative shown in lines (e) and (f) are obtained. Thus no products proportional to the amplitude squared are depicted in FIG. 8.

It will be noted that the normalized derivatives $Px'$ and $Py'$ shown on lines (e) and (f) of FIG. 8 precisely correspond to the half cycles of the derivatives $x'$ and $y'$ from which they were derived. Thus the polarity information of the derivatives is preserved while its amplitude information is removed in obtaining the quantities *Px'* and *Py'*. Since all of the amplitude information is available in the x and y input signals no essential information is lost in obtaining the products *xPy'* and *yPx'*. On the contrary, the advantages of processing the amplitude of the signal as the first power thereof while maintaining the polarity as obtained with four quadrant multiplication is achieved by the simple expedient of differentiating the *x* and *y* waves and limiting their amplitude value. Although the limiting function is shown as it would appear with infinite gain amplification, "soft" limiting may be employed to provide some dynamic response to the product *xy'* for low level signals with the zero slicers providing a hard limiting polarity-only signal for larger magnitude echo returns.

Figure 9:
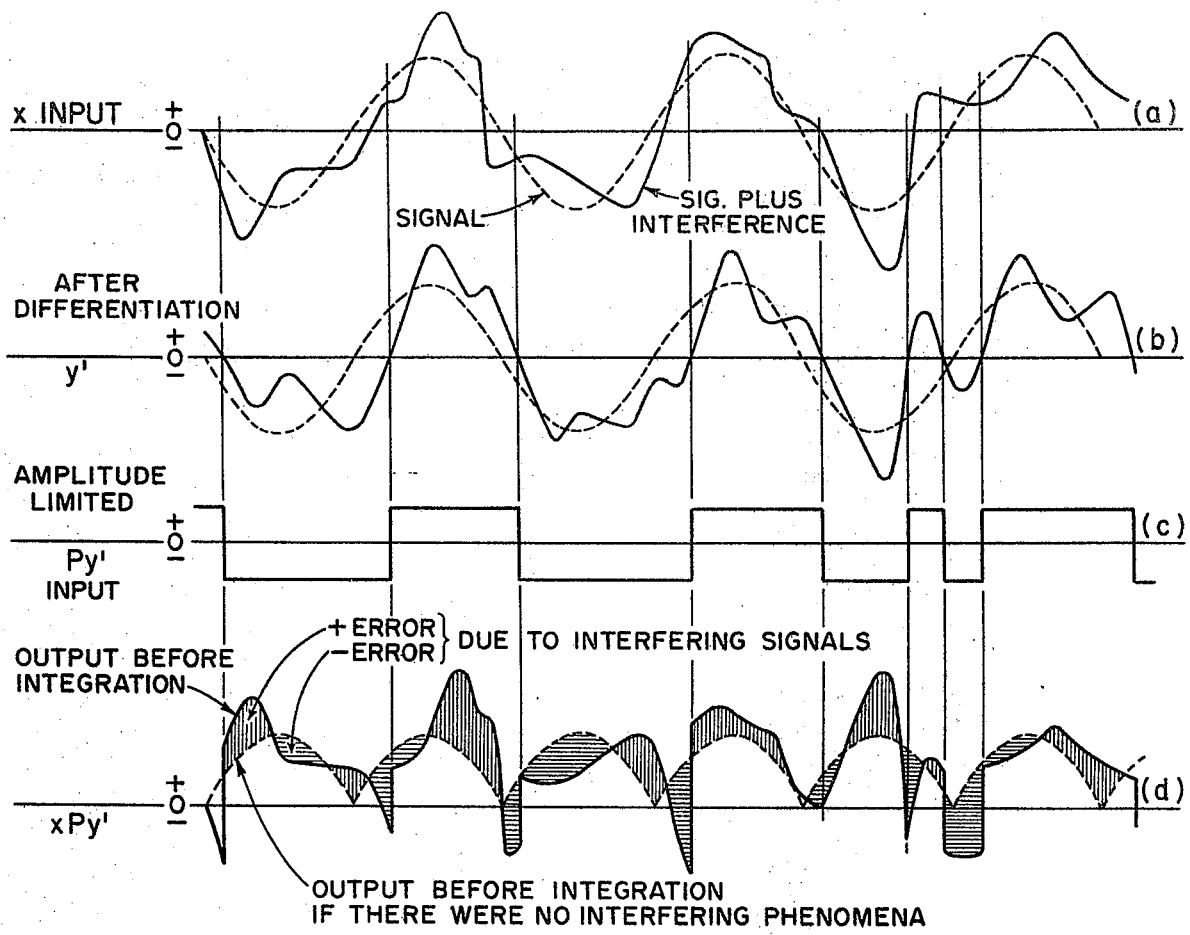
FIG. 9 is a set of wave form diagrams showing the operation of the system of FIG. 7 with both moving targets and interfering signal phenomena occurring simultaneously.

Referring now to FIG. 9 a representation of the operation of the system of FIG. 7 in the presence of both moving targets and interfering signal phenomena will be described. In FIGS. 9(*a*) and (*b*) the dotted curve represents the substantially sinusoidal signal component produced by a good target reflector moving at approximately constant velocity. The clutter signal components which are uniformly distributed in the spectrum on opposite sides of the transmitter frequency will result in components which are distributed relative to the signal return from the moving target. The combination of these distributed signals with the sinusoidal return from the moving target will produce typically an *x* signal as shown in line (*a*) as the solid curve. A similar signal displaced 90° in phase is obtained as the y signal from the other mixer and after differentiation this signal would appear relative to the *x* signal as shown in line (*b*) of FIG. 9. By zero slicing or limiting the signal on line (*b*) the normalized or constant amplitude of line (*c*) is obtained having the same polarity information as contained in the *y'* signal of line (*b*). The multiplication of lines (*a*) and (*c*) produces the signal indicated on line (*d*). As can be seen the four-quadrant multiplication has rectified target signal components to be of a single (positive) polarity with the clutter component signals distributed above and below the dotted rectified sinusoidal waveform. During integration, of course, the plus and minus clutter error relative to the dotted line curve will cancel and the true target signal is recovered despite the presence of the clutter return signals.

Figure 10:
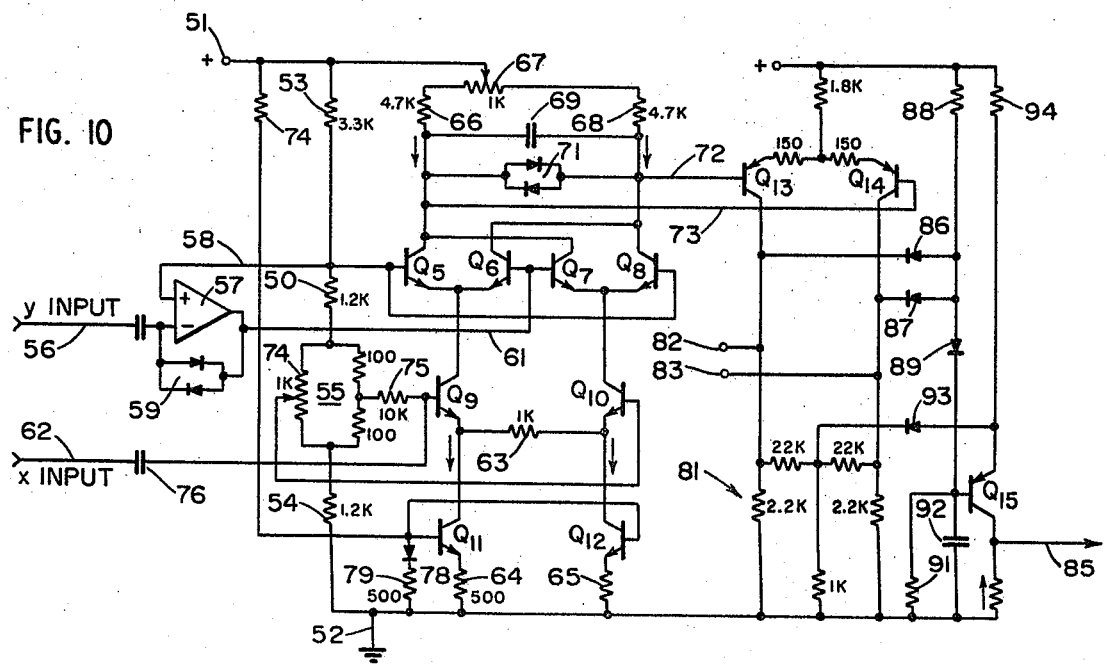
FIG. 10 is a schematic wiring diagram for a simplified fourquadrant multiplier with one factor normalized.

FIG. 10 is a schematic wiring diagram for a solid state or integrated circuit implementation of a simplified system generally corresponding to that described and shown by FIG. 7. In this implementation the four-quadrant multiplier has one linear channel for faithfully introducing the amplitude function of one signal channel while the other factor is processed as polarity information only as described in FIG. 7 and thus this channel is simplified and combined as part of the slicing or limiting function. Referring to FIG. 10 the circuit will be seen to operate from a DC supply such as 12 volts applied to terminal 51 and ground 52. Across this voltage supply a voltage divider is connected consisting of the series connection of resistors 53 50, 54 and the intermediate balancing resistor combination 55. This voltage divider provides appropriate operating potentials for the circuit as hereinafter described.

The polarity-only factor for the multiplication is obtained by applying the *y* input signal corresponding to that shown in FIG. 7 to a terminal 56 which is capacitor coupled to the negative input of an operational amplifier 57 which has its positive input referenced on line 58 to the junction between voltage divider resistors 53 and 50. A pair of back-to-back diodes 59 is connected from the output to the negative input of op amp 57 and the combination with the coupling capacitor thus operates to differentiate the *y* input signal on terminal 56 and switch the output signal between a maximum positive and negative value as the polarity of the differentiated wave varies above and below the reference potential supplied as an input on line 58. Thus the output on line 61 corresponds to the *Py'* signal of the differentiated but polarity-only *y* input signal.

The linear factor for the multiplication is introduced on a terminal 62 where it is applied to a balanced series cascade of transistors comprising switching pairs $Q_5$, $Q_6$, and $Q_7$, $Q_8$, which pairs have their emitters joined and respectively connected to the collectors of transistors $Q_9$, $Q_{10}$, which in turn have their emitters bridged by a resistor 63 and connected respectively to the collectors of transistors $Q_{11}$, $Q_{12}$, the emitters of which are returned through 500 ohms resistors 64 and 65 to ground. The collectors of $Q_5$ and $Q_7$ are joined and connected through a 4.7 Kohm resistor 66 and a balancing potentiometer 67 to the positive supply. The collectors of $Q_6$ and $Q_8$ are joined and returned through a 4.7 Kohm resistor 68 and the balancing potentiometer 67 to the positive supply. The joined collector pairs of $Q_5$, $Q_7$, and $Q_6$, $Q_8$, are bridged by a capacitor 69 and a pair of back-to-back diodes 71. The output of the multiplier is derived from these same joined collector pairs on lines 72, 73.

The bases of $Q_5$ and $Q_8$ are joined and connected to the reference potential of line 58. The bases of $Q_6$, $Q_7$, are joined and connected to the polarity switching factor for the multiplication on lines 61. Thus the transistor pairs $Q_5$, $Q_6$, and $Q_7$, $Q_8$, switch the polarity of their output on the joined collectors connected to output lines 72, 73 in accordance with the polarity of the signal on line 61 referenced to the potential on line 58 and the polarity of the *x* input on line 62 relative to the biase in $Q_9$, $Q_{10}$, to provide four quadrant product polarity from these two factors.

The transistors $Q_9$, $Q_{10}$ provide a current balance for the multiplier system and an appropriate bias level for the introduction of the linear *x* input signal from line 62. For this purpose the base of $Q_9$ is connected through a 10Kohm resistor 75 to a mid-point on the balancing resistor grouping 55 while the base of $Q_{10}$ is connected to the adjustable tap on a potentiometer 74. The base of $Q_9$ is connected through coupling capacitor 76 to the input terminal 62.

The operating current point for the balanced cascade is provided by transistors $Q_{11}$ and $Q_{12}$ which have their bases connected together and returned to the positive supply through a resistor 77. A current mirror comprising diode 78 and resistor 79 is connected from the joined bases of $Q_{11}$, $Q_{12}$ to ground.

In the operation of the circuit of FIG. 10 as thus far described, the tap on potentiometer 74 is adjusted for current balance through the series cascade transistors and the tap on potentiometer 67 is adjusted to provide a voltage balance on output lines 72, 73, such that the voltage between lines 72 and 73 is zero whenever either of the input factors *x* or *y* is zero. The potential between output lines 72, 73, will thus be an amplitude analog of the linear *x* input signal at terminal 72 with polarity controlled by four-quadrant multiplication with the signal on line 61. Thus the potential across lines 72 and 73 will be positive (arbitrary polarity) for *x* and *y* input signals in the first and third quadrants and of negative polarity for input signals in the second and fourth quadrants. These signals are integrated by capacitor 69 and limited by diode 71 to prevent overloading of subsequent circuits.

The integrated $xPy'$ signal on lines 72 and 73 will remain at substantially zero level for absence of moving reflectors in the energy field between the transmitting and receiving transducers and will show a positive or negative polarity signal for an approaching or receding target. To utilize a signal which integrates with either positive or negative polarity preponderance, a balanced threshold circuit comprising transistors $Q_{13}$, $Q_{14}$ is used. The signal across lines 72, 73 is applied between the bases of $Q_{13}$, $Q_{14}$ and a balanced output signal is developed in the symmetrical resistor network 81 connected to the collectors of $Q_{13}$ and $Q_{14}$. Test points 82 and 83 may be provided to connect a meter for bipolar indication of approaching and receding targets.

A threshold biased transistor $Q_{15}$ is provided to operate an alarm system connected to output lead 85 upon the occurrence of a signal of either polarity of sufficient magnitude at the collectors of transistors $Q_{13}$, $Q_{14}$. For this purpose, these collectors are connected through diodes 86 and 87 to a point returned to the positive potential through a resistor 88 and connected through a diode 89 to the base of transistor $Q_{15}$. The base of $Q_{15}$ is biased by a resistor 91 which is returned to ground and bypassed by capacitor 92 which provides additional integration. The operating point for transistor $Q_{15}$ is obtained by referencing the emitter through diode 93 to a mid-tap on the resistor network 81 and returning the emitter through a resistor 94 to the positive supply. Thus in the operation of the circuit of FIG. 10 an actuating output signal will appear at output line 85 whenever the bias of transistor $Q_{15}$ is overcome by the magnitude of a signal on the base thereof derived from either polarity of the output from transistors $Q_{13}$, $Q_{14}$, corresponding to the bipolar moving target signal inputs thereto on lines 72, 73. As previously described, this bipolar signal on lines 72, 73 is the four-quadrant multiplication of the x and y input signals with one channel normalized or containing polarity information only but otherwise containing the full information content of the signal and noise components. Furthermore, since the threshold bias for $Q_{15}$ is referenced to a point on the balanced network 81 and direct coupled through $Q_{13}$, $Q_{14}$, to the reference level of the bipolar signal on lines 72, 73, the alarm actuation will occur for a percentage change in signal level and relatively independent of changes in supply voltage.

It will be appreciated that the present invention by operating continuously on the return signals provices the maximum available statistical base over which to accumulate the like polarity signal components contributed by returns from a true moving target. Similarly, all of the noise and clutter components which are distributed throughout the signal spectrum within the normal doppler signal range relative to the transmitter frequency are translated respectively into opposite polarity components and thus cancel. Thus maximum discrimination between these two types of signal returns is possible together with the other explicit and inherent advantages of the invention as disclosed.

Many modifications of the invention will be apparent to those skilled in the art, particularly in relation to achieving the operational functions desired. Thus various forms of differentiators and four-quadrant multipliers may be employed to achieve the functions required for the operations specified herein. The invention, accordingly, is not to be limited to the specific embodiments disclosed but only by the scope of the appended claims.

I claim:

1. The method of detecting moving target echos in the presence of interference comprising the steps of radiating energy and receiving echo return energy, hetrodyning radiated and received energy signals to produce separate quadrature beat frequency signals, differentiating and amplitude limiting one of said beat frequency signals, multiplying the differentiated and limited signal and the other beat frequency signal to obtain the four quadrant product of the signals multiplied, and integrating said product.

2. In an echo signal intrusion alarm system having enhanced detection capability for moving objects in the presence of interference and clutter return echos wherein a signal is transmitted into a protected zone and reflected signals are received from said zone, said system including first and second quadrature mixing means for mixing signals corresponding to the transmitted and received signals to produce direction sensitive quadrature output signals in accordance with the beat frequency between said transmitted and received signals, the improvement comprising phase rotation processor means responsive to the full information content of a predetermined bandwidth of said quadrature output signals for producing a bipolar signal in accordance with the product of the magnitudes of said quadrature output signals multiplied by said beat frequency, means for integrating said bipolar signal, and threshold means responsive to the magnitude of the integrated bipolar signal exceeding a predetermined value for providing an alarm signal.

3. Apparatus according to claim 2 in which said phase rotation processor means comprises a two-phase induction motor having two sets of orthogonally positioned stator windings and a locked rotor, said quadrature output signals being applied to energize the respective windings of said sets, and means coupled to said rotor and responsive to the magnitude and sense of the torque exerted on said rotor by the energized said windings for producing said bipolar signal.

4. In an echo signal intrusion alarm system having enhanced detection capability for return echos from a moving object in the presence of interference and clutter return wherein a signal is transmitted into a protected zone and reflected signals are received from said zone, said system including first and second quadrature mixing means for mixing signals corresponding to the transmitted and received signals to produce direction sensitive quadrature output signals in accordance with the beat frequency between said transmitted and received signals, the improvement comprising:

means for multiplying each of said quadrature output signals by a factor obtained from the time derivative of the other quadrature output signal to obtain two four-quadrant products of the signal and factor multiplied;

means for subtracting said products to obtain a difference signal;

integrating means responsive to said difference signal for cancelling opposite polarity signal components corresponding to said interference and clutter return and accumulating an integrated signal magnitude from signal components of the same polarity corresponding to a given direction of motion for said moving object; and means responsive to a predetermined accumulated level of said integrated signal magnitude for producing an alarm signal.

5. Apparatus according to claim 4 in which said factor is proportional to the time derivative of said other quadrature output signal and said four-quadrant products are proportional respectively to the product of the amplitudes of both of said quadrature output signals.

6. Apparatus according to claim 4 and including zero-slicer means operative on each said time derivative to obtain said factor for making said four-quadrant products proportional to the amplitude of only one of said quadrature output signals.

7. Apparatus according to claim 4 and including zero-slicer means operative on one of the inputs to said means for multiplying for making said four-quadrant products proportional to the amplitude of only one of said quadrature output signals.

8. In an echo signal intrusion alarm system having enhanced detection capability for return echos from a moving object in the presence of interference and clutter return wherein a signal is transmitted into a protected zone and reflected signals are received from said zone, said system including first and second quadrature mixing means for mixing signals corresponding to the transmitted and received signals to produce direction sensitive quadrature output signals in accordance with the beat frequency between said transmitted and received signals, the improvement comprising:

means for multiplying one of said quadrature output signals by a factor obtained from the time derivative of the other quadrature output signal to obtain the four-quadrant product of the signal and factor multiplied;

zero-slicer means operative on said time derivative to obtain said factor for making said four-quadrant product proportional to the amplitude of only said one of said quadrature output signals;

integrating means responsive to said product for cancelling opposite polarity signal components corresponding to said interference and clutter return and accumulating an integrated signal magnitude from signal components of the same polarity corresponding to a given direction of motion for said moving object; and means responsive to a predetermined accumulated level of said integrated signal magnitude for producing an alarm signal.

9. In an echo signal intrusion alarm system having enhanced detection capability for return echos from a moving object in the presence of interference and clutter return wherein a signal is transmitted into a protected zone and reflected signals are received from said zone, said system including first and second quadrature mixing means for mixing signals corresponding to the transmitted and received signals to produce direction sensitive quadrature output signals in accordance with the beat frequency between said transmitted and received signals, the improvement comprising:

a four quadrant multiplier having a bipolar product output;

a time differentiator coupled to differentiate one of said quadrature output signals;

means for coupling the other of said quadrature output signals and the output of said differentiator as input factors to said multiplier;

zero-slicer means coupled to the output of said time differentiator operative to remove amplitude information from the one of said input factors derived from said time differentiator;

an integrator for said bipolar output product of said multiplier; and threshold means responsive to a predetermined value of the output of said integrator for indicating a signal condition.

10. In an echo signal intrusion alarm system having enhanced detection capability for return echos from a moving object in the presence of interference and clutter return wherein a signal is transmitted into a protected zone and reflected signals are received from said zone, said system including first and second quadrature mixing means for mixing signals corresponding to the transmitted and received signals to produce direction sensitive quadrature output signals in accordance with the beat frequency between said transmitted and received signals, the improvement comprising:

a balanced modulator having signal and switching input terminals;

means coupling one of said quadrature output signals to said signal input terminals;

differentiating, zero-slicing operational amplifier means operating on the other of said quadrature output signals and having the output thereof coupled to said switching input terminals;

integrating and signal limiting means operative on the output of said balanced modulator;

a balanced bias circuit coupled to the output of said balanced modulator; and a threshold circuit biased from a reference point in said bias circuit and responsive to signal excursions of either polarity relative to said reference point for producing an output actuation signal for said excursions which exceed a predetermined percentage change relative to said bias point.

* * * * *

UNITED STATES PATENT AND TRADEMARK OFFICE
CERTIFICATE OF CORRECTION

PATENT NO. : 3,942,178
DATED : March 2, 1976
INVENTOR(S) : Kenneth R. Hackett

It is certified that error appears in the above-identified patent and that said Letters Patent are hereby corrected as shown below:

Column 4, line 23, equation 6, "$V_{T2} = V_y \; {}^x\!\rho$"

should read -- $V_{T2} = V_y \frac{x}{\rho}$ --;

Column 4, line 33, equation 8, "m = K(xy'= yx')"

should read -- m = K(xy' - yx') --;

Column 5, line 11, delete "107." and substitute -- ω. --;

Column 5, line 21, delete "quantity xu'" and insert

-- quantity xy' --;

Column 5, line 28, delete "xx'" and insert -- yx' --

Column 5, line 35, delete "xx'" and insert -- yx' --;

Column 5, line 38, change "FIG)" to -- FIG. --;

Column 6, line 13, delete "signatl" and insert -- signal --;

Column 6, line 22, change "Py'" to -- Px' --;

Column 6, line 22, change "y'" to -- x' --'

Column 6, line 22, delete "The outputs of";

Column 6, line 23, delete "amplitude: and insert -- but constant amplitude --.

Signed and Sealed this

Seventh Day of September 1976

[SEAL]

Attest:

RUTH C. MASON
Attesting Officer

C. MARSHALL DANN
Commissioner of Patents and Trademarks